United States Patent
Funabashi et al.

(10) Patent No.: US 7,385,779 B2
(45) Date of Patent: Jun. 10, 2008

(54) DISK DEVICE WITH BI-DIRECTIONAL COMMUNICATION FUNCTION

(75) Inventors: Kei Funabashi, Kawasaki (JP);
Tomoyoshi Yamada, Kawasaki (JP);
Takeyori Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/698,567

(22) Filed: Jan. 25, 2007

(65) Prior Publication Data
US 2007/0263315 A1 Nov. 15, 2007

(30) Foreign Application Priority Data
May 9, 2006 (JP) .............................. 2006-129987

(51) Int. Cl.
*G11B 21/02* (2006.01)
(52) U.S. Cl. ...................................... 360/75
(58) Field of Classification Search .................. 360/75, 360/69, 77.02, 77.08, 77.06, 78.04, 78.09, 360/77.01
See application file for complete search history.

(56) References Cited

U.S. PATENT DOCUMENTS

| | | | |
|---|---|---|---|
| 5,105,318 A * | 4/1992 | Tsuneta et al. ............ | 360/77.01 |
| 5,521,772 A | 5/1996 | Lee et al. | |
| 5,677,809 A * | 10/1997 | Kadlec ..................... | 360/78.09 |
| 5,684,650 A * | 11/1997 | Kadlec et al. ............ | 360/77.06 |
| 5,914,829 A * | 6/1999 | Kadlec et al. ............ | 360/78.04 |
| 6,347,018 B1* | 2/2002 | Kadlec et al. ............ | 360/77.08 |
| 7,116,513 B1* | 10/2006 | Sun et al. ................. | 360/77.02 |
| 2004/0246618 A1* | 12/2004 | Ehrlich ..................... | 360/77.02 |

FOREIGN PATENT DOCUMENTS

| | | |
|---|---|---|
| JP | 03-102683 | 4/1991 |
| JP | 7-192415 | 7/1995 |

* cited by examiner

*Primary Examiner*—Fred F. Tzeng
(74) *Attorney, Agent, or Firm*—Greer, Burns & Crain, Ltd.

(57) ABSTRACT

A plurality of HDDs 12-1~12-n connected around a host 10 can be made to directly communicate with each other. For example, an HDD 12-1 makes another HDD to perform long distance seek using this communication line and measures the influence of vibration caused at that time. The measurement result is formed into a transfer function indicating the position change of the head of the relevant HDD against the operation of another HDD. An HDD is actually driven by a current value obtained by correcting the normal driving current of the driving motor of the head by the transfer function.

10 Claims, 14 Drawing Sheets

| Ls | : LONG DISTANCE SEEK CAUSING EXTERNAL VIBRATION |
| s | : SHORT DISTANCE SEEK |
| w | : WRITING |
| ▨ | : WAITING TIME |

DISK DEVICE WITH BI-DIRECTIONAL COMMUNICATION FUNCTION

BACKGROUND OF THE INVENTION

1. Field of the Invention

The present invention relates to a disk device installed in a server or the like.

2. Description of the Related Art

Today an information processing technology advances and information processing devices are widely used. In such a situation, the large capacity of servers for electronically providing services is promoted and the collective process of lots of information is requested. In order to collectively process lots of information, a hard disk for storing a large amount of data is needed. Therefore, a server in which a plurality of hard disk devices is installed in the same cabinet is widely used.

Figure 1:
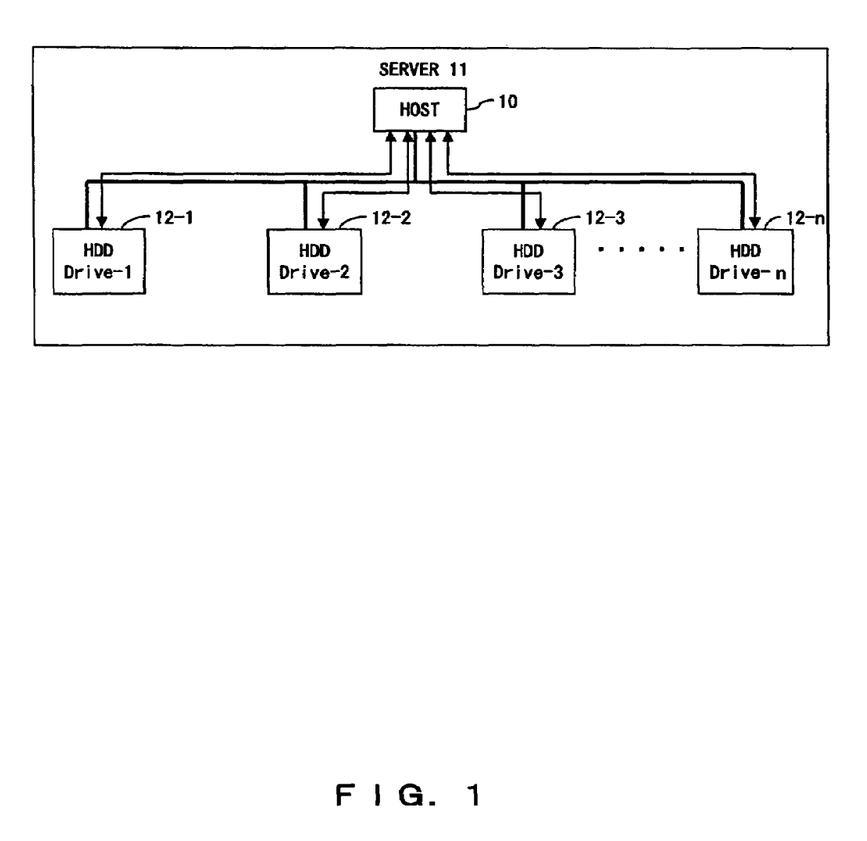
FIG. 1 shows the concept of the conventional server.

FIG. 1 shows the conceptual configuration of the conventional server.

As shown in FIG. 1, a server 11 comprises a host 10 for performing a major data process and n hard disk drives (HDD drives-1~n) for data to be processed by the host 10, already processed data and the like. Conventionally, each hard disk drive is directly connected to the host 10 and information is exchanged between the host 10 and each hard disk drive. In this case, no internal information is bi-directionally communicated/exchanged among the hard disk drives. However, if a plurality of hard disk drives is installed in the same cabinet, vibration caused by the operation of a specific hard disk drive sometimes travels to another hard disk drive. In this case, vibration caused by the seek operation of an adjacent hard disk drive affects the positioning of the head of another hard disk drive.

Conventionally, since a plurality of hard disk drives are independently operated, no internal information cannot be bi-directionally communicated/exchanged among the hard disk drives. When external vibration due to the operation of another hard disk drive is large, writing occurs in the relevant hard disk drive. In this case, there is a possibility that swing writing (a state where the head swings during writing) or distorted writing (a state where the head position deviates from the home position) occurs in the relevant hard disk drive. There is the concept of an autonomous disk, in which an interface or interface controller in its higher-layer exchanges information among hard disk drives. In this case, the response of a hard disk delays by a time taken for information to be exchanged among hard disk drives via the higher layer.

SUMMARY OF THE INVENTION

It is an object of the present invention to provide a hard disk drive capable of writing data while suppressing the influence of the operation of another hard disk drive in an information processing device in which a plurality of hard disk drives are installed in the same cabinet.

The disk device of the present invention has a plurality of hard disk drives disposed in an environment where vibration due to the operation of the relevant disk drive affects another operation of another disk drive. The disk device comprises an acquisition means for obtaining the operational state of another disk drive and a control means for controlling the operation of the head of the relevant disk drive in such a way as to reduce the influence of the operation of another disk drive.

According to the present invention, even when external vibration is large, no writing occurs in the relevant hard disk drive. Therefore, the risk of swing writing and distorted writing can be reduced. Since feedback control can also be applied to external vibration caused by an adjacent hard disk drive, the risk of swing writing and distorted writing can be reduced.

DESCRIPTION OF THE PREFERRED EMBODIMENTS

Figure 2:
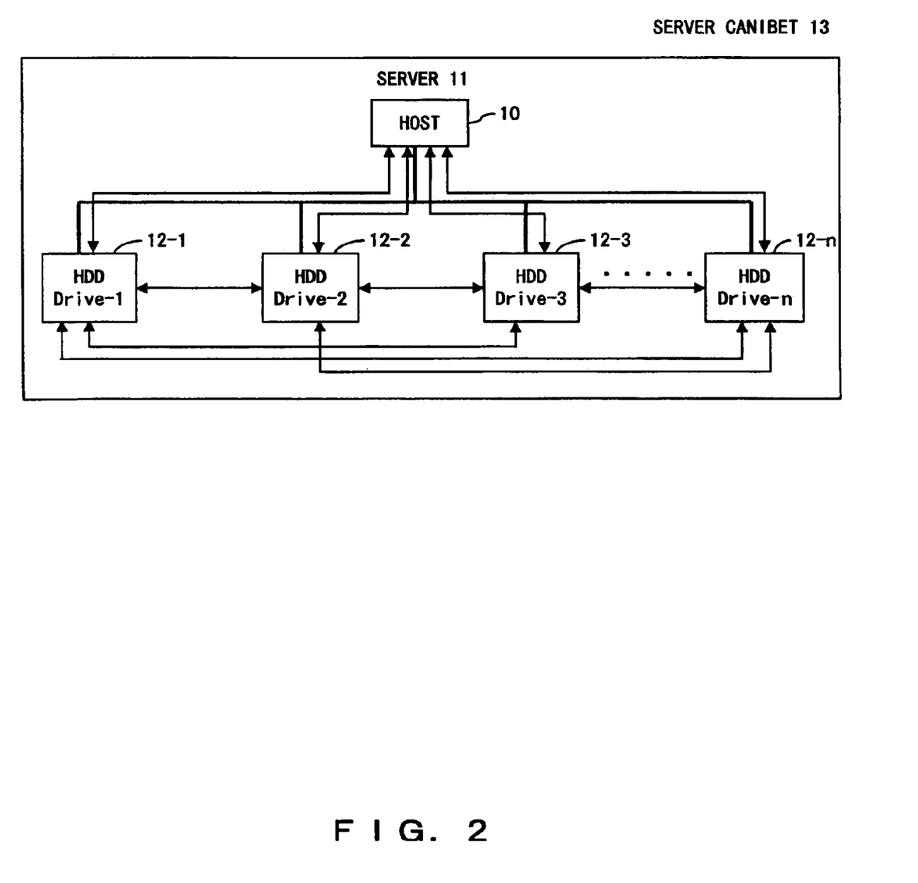
FIG. 2 shows the concept of the hard disk device in the preferred embodiment of the present invention.

FIG. 2 shows the concept of the disk device in the preferred embodiment of the present invention.

As shown in FIG. 2, n (plural) hard disk drives (hereinafter called "HDD 12-1~12-n") installed on a server cabinet 13 are connected to each other wired or wirelessly and internal information is bi-directionally communicated/exchanged among them. Then, when wanting to write or read data, each HDD operates by itself after checking in what operational state the other HDDs are. The HDDs have a transfer function among them and performs feed forward control.

The HDDs 12-1~12-n are connected to the host 10, and in the same way as conventionally, receives write and read commands from the host 10. The HDDs 12-1~12-n are installed in one server cabinet 13 as a part of the server 11.

Therefore, if another HDD operates when a specific HDD attempts to write data, the vibration travels to the relevant HDD to affect it. In this case, internal information indicating the operational state of the HDDs is transmitted/received among the HDDs 12-1~12-*n* and the relevant HDD is operated in such a way as to be affected by the operation of another HDD.

Figure 3:
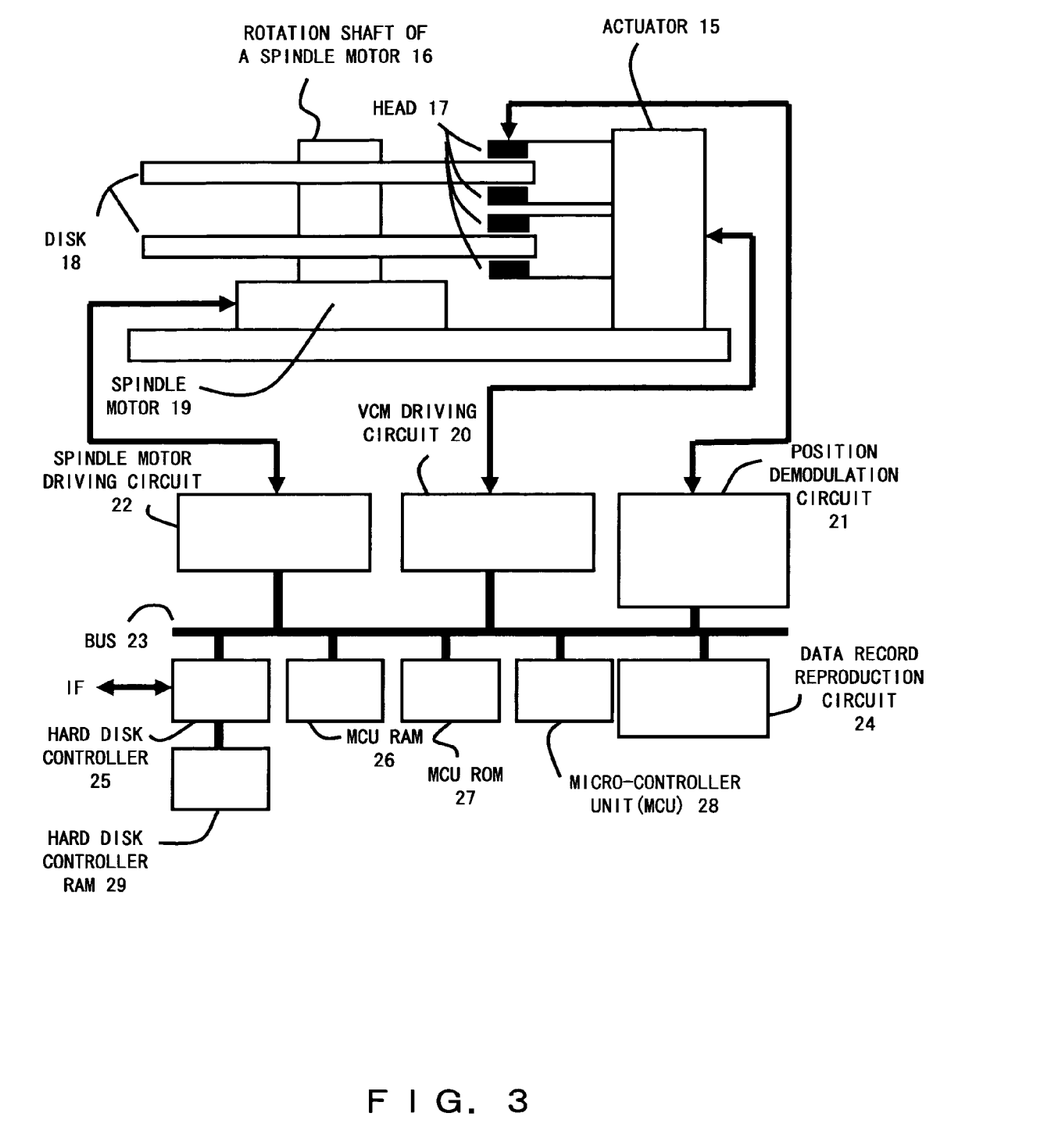
FIG. 3 shows the configuration of an HDD.

FIG. 3 shows the configuration of an HDD.

Data is written into a disk 18. The disk 18 is supported by the rotation shaft 16 of a spindle motor 19 and is rotated by the spindle motor 19. The spindle motor 19 is driven by a spindle driving circuit 22. The spindle driving circuit 22 is connected to a bus 23 and receives its driving signal via the bus 23. Data is written into and read from the disk 18 by a head 17. The head 17 is operated by an actuator 15. The actuator 15 is driven by a voice coil motor (VCM) driving circuit 20. The VCM driving circuit 20 is connected to the bus 23 and receives its driving signal via the bus 23. The position of the head 17 is detected by a position demodulator 21 and it can be checked whether the head 17 correctly operates.

To the bus 23, a hard disk controller 25, a micro-controller (MCU) unit, a data record reproduction circuit 24, the ROM 27 of the MCU 28 and the RAM 26 of the MCU 28 are connected in addition to the above. The MCU 28 controls the entire HDD shown in FIG. 3 to write/read data into/from the disk 18, based on data or a program stored in the ROM 27 of the MCU 28 and the RAM 26 of the MCU 28. The hard disk controller 25 controls the number of rotations of the spindle motor 19 and the operation of the actuator 15. The operation of the actuator 15 is controlled by determining whether the position of the head 17, obtained by a position demodulation circuit 21 is correct. The hard disk controller 25 comprises RAM 29 for the hard disk controller 25. The hard disk controller 25 uses the RAM 29 as the working memory of a process needed to control the disk 18 and the head 17. The hard disk controller 25 is connected to the host 25 via an interface and receives write and read commands from the host 10. Upon receipt of a write command or a read command, the hard disk controller 25 makes the MCU 28 to execute it. In this preferred embodiment, internal information is transmitted/received among the HDDs via the hard disk controller 25.

Figure 4:
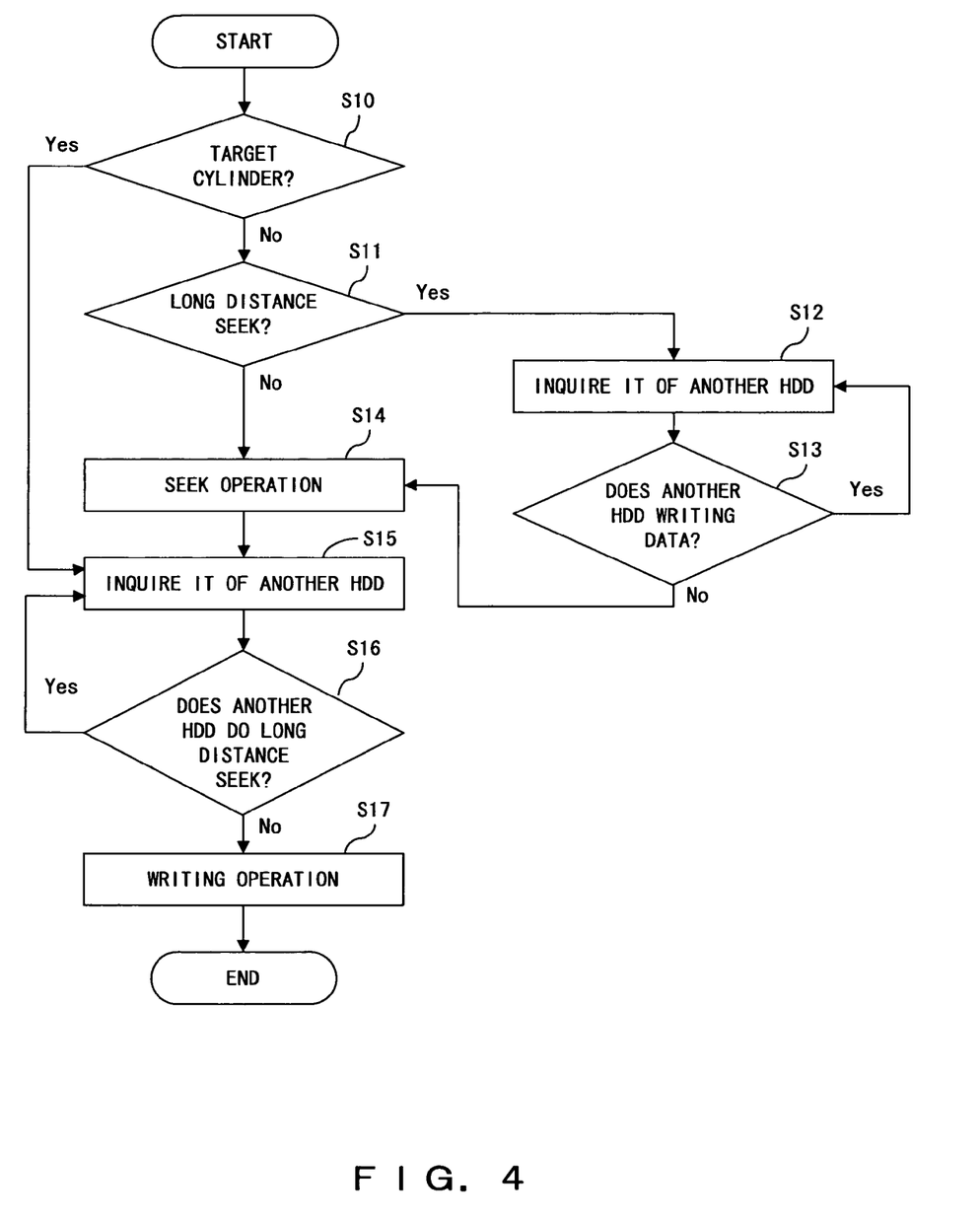
FIG. 4 is a flowchart showing the process to be performed after the hard disk drive receives each of write command and a read command, in the first preferred embodiment of the present invention (No. 1)
Figure 5:
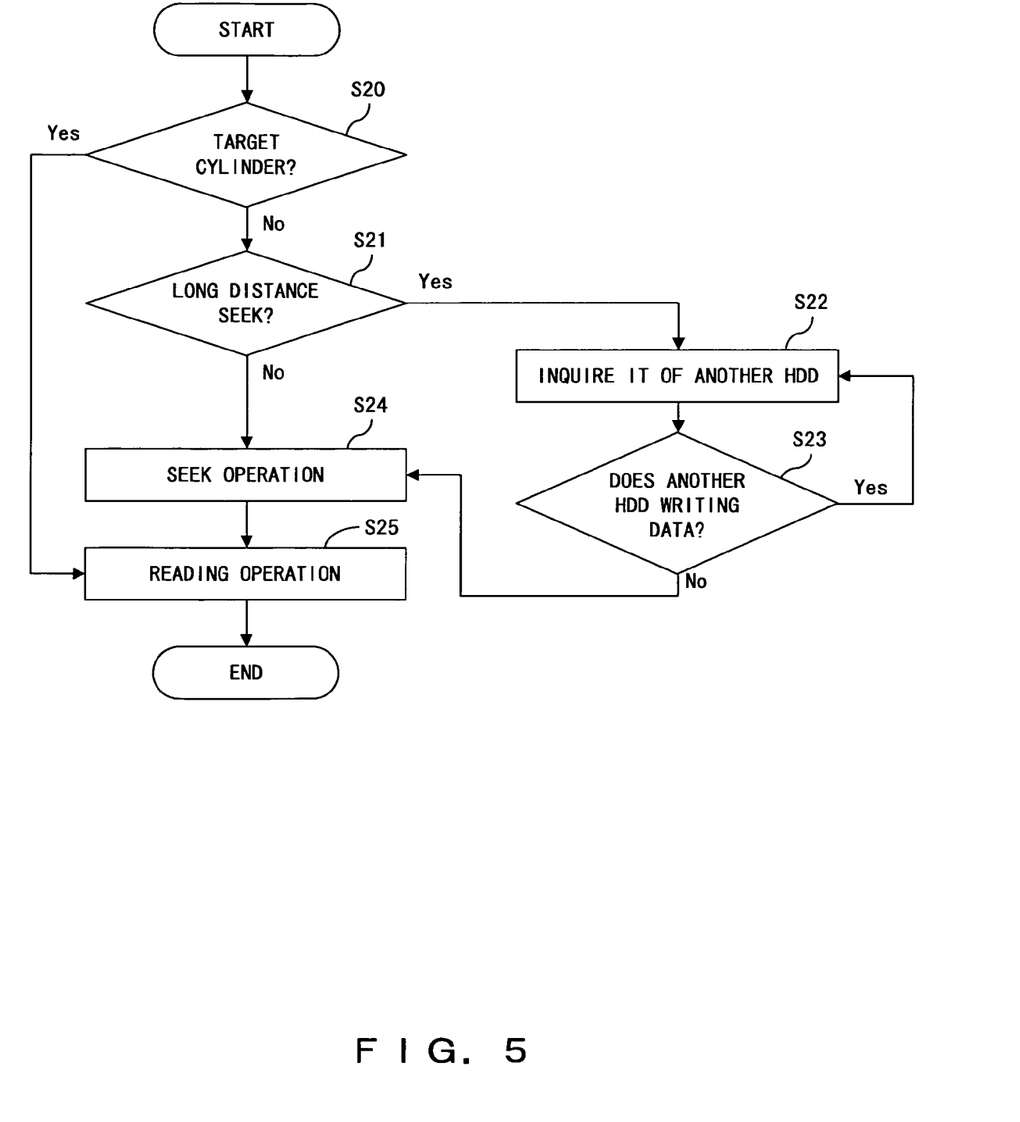
FIG. 5 is a flowchart showing the process to be performed after the hard disk drive receives each of write command and a read command, in the first preferred embodiment of the present invention (No. 2)

FIGS. 4 and 5 are flowcharts showing the process to be performed after the HDD receives each of write command and a read command, in the first preferred embodiment of the present invention.

When performing long distance seek which tends to incur large external vibration, it must be performed after confirming that no other HDD is writing data. When writing data, it is performed after confirming that no other HDD is performing long distance seek.

Long distance seek means seek covering beyond a prescribed distance obtained by an experiment or the like, which affects another HDD in the same cabinet.

FIG. 4 shows the process after an HDD receives a write command. Firstly, when receiving a write command, in step S10, it is determined that it is a target cylinder to write data. If it is not determined to be a target cylinder, the flow proceeds to step S11. If it is determined to be a target cylinder, the flow proceeds to step S15. In step S11 it is determined whether the relevant HDD performs long distance seek. If it is not long distance seek, the flow proceeds to step S14. If it is long distance seek, the flow proceeds to step S12. In step S12 the relevant HDD inquires of another HDD if it is not writing data before performing long distance seek which affects another HDD. In step S13, it is determined whether another HDD is writing data. If in step S13 it is determined that another HDD is writing data, the flow returns to step S12. In step S12, the relevant HDD inquires of another HDD if it is not writing data and waits for the termination of the writing. If in step S13 it is determined that no other HDD is writing data, in step S14 the relevant HDD performs a seek operation. Then, in step S15 the relevant HDD inquires of another HDD if it is performing long distance seek before writing data. If in step S16 it is determined that another HDD is performing long distance seek. If in step S16 it is determined that another HDD is performing long distance seek, the flow returns to step S15 and continues to inquire and waits for the termination of the long distance seek. If in step S16 it is not determined that another HDD is performing long distance seek, in step S17 the relevant HDD writes data.

FIG. 5 shows the process after an HDD receives a read command.

In step S20, it is determined whether it is a target cylinder to be read. If in step S20 it is determined that the head does not arrive at the target cylinder, in step S21 it is determined whether long distance seek is necessary. If in step 21 it is not determined that long distance seek is necessary, the flow proceeds to step S24. If in step 21 it is determined that long distance seek is necessary, in step S22 internal information is obtained from the other HDDs. Then, in step S23, it is determined whether another HDD is writing data. If in step S23 it is determined that another HDD is writing data, the flow returns to step S22 and waits for the termination of the writing. If in step S23 it is determined that no other HDD is writing data, the flow proceeds to step S24 and the relevant HDD operates seek. Then, in step S25, the relevant HDD reads data and the process terminates.

Figures 6A, 6B:
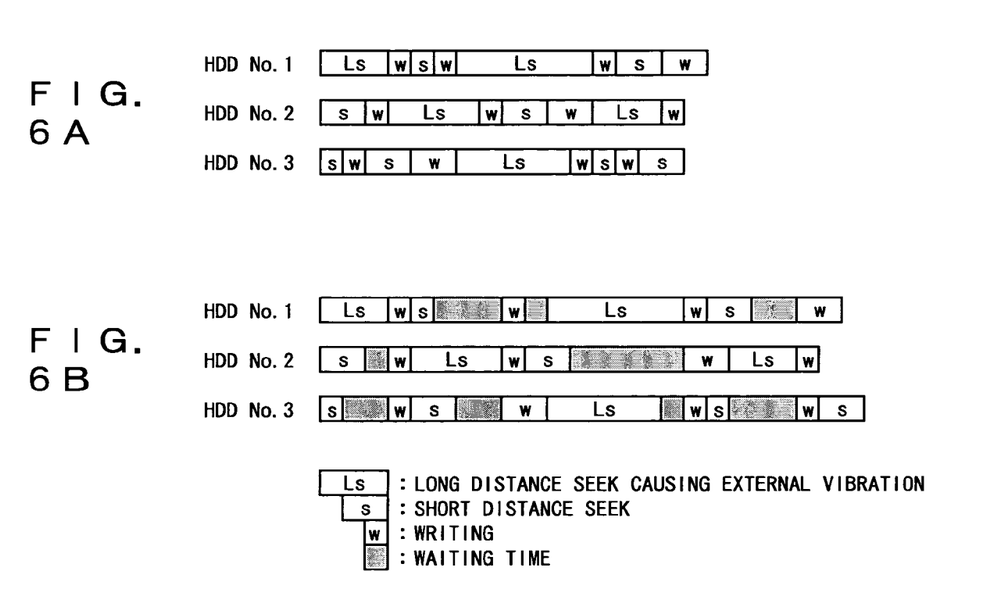
FIGS. 6A and 6B show the difference in an operational timing between the prior art and the first preferred embodiment of the present invention.

FIGS. 6A and 6B show the difference in an operational timing between the prior art and the first preferred embodiment of the present invention.

As shown in FIG. 6A, in the prior art, even when a plurality of HDDs is accommodated into the same cabinet, each HDD operates independently. Therefore, even while an HDD is performing long distance seek which affects another HDD, another HDD can write data indifferently. Specifically, in a timing HDD No. 1 shown in FIG. 6A performs long distance seek represented by "Ls", HDDs No. 2 and 3 write data. Even in a timing HDDs No. 2 and 3 perform long distance seek, HDD No. 1 writes data.

However, in the preferred embodiment of the present invention shown in FIG. 6B, while HDD No. 1 performs long distance seek, HDDs No. 2 and 3 defers its writing. Therefore, there is the waiting time indicated by slash. While any HDD is writing data, the other HDDs defer their waiting. However, when short distance seek is performed, it affects no other HDD. Therefore, there is no need for the other HDDs to defer their writing. While another HDD is writing data, there is no need for the HDD to defer the short distance seek. Thus, in the preferred embodiment of the present invention, the timing of the long distance seek operation of any HDD accommodated in the same cabinet and the timing of the writing operation of any other HDD are exclusively set each other.

In this way, in the preferred embodiment of the present invention, the relevant HDD is driven in such a way as to avoid the influence of another HDD operation.

However, in the following preferred embodiments, the influence of another HDD operation is killed using a transfer function by taking into consideration and controlling the influence of another HDD when driving the relevant HDD.

Figure 7:
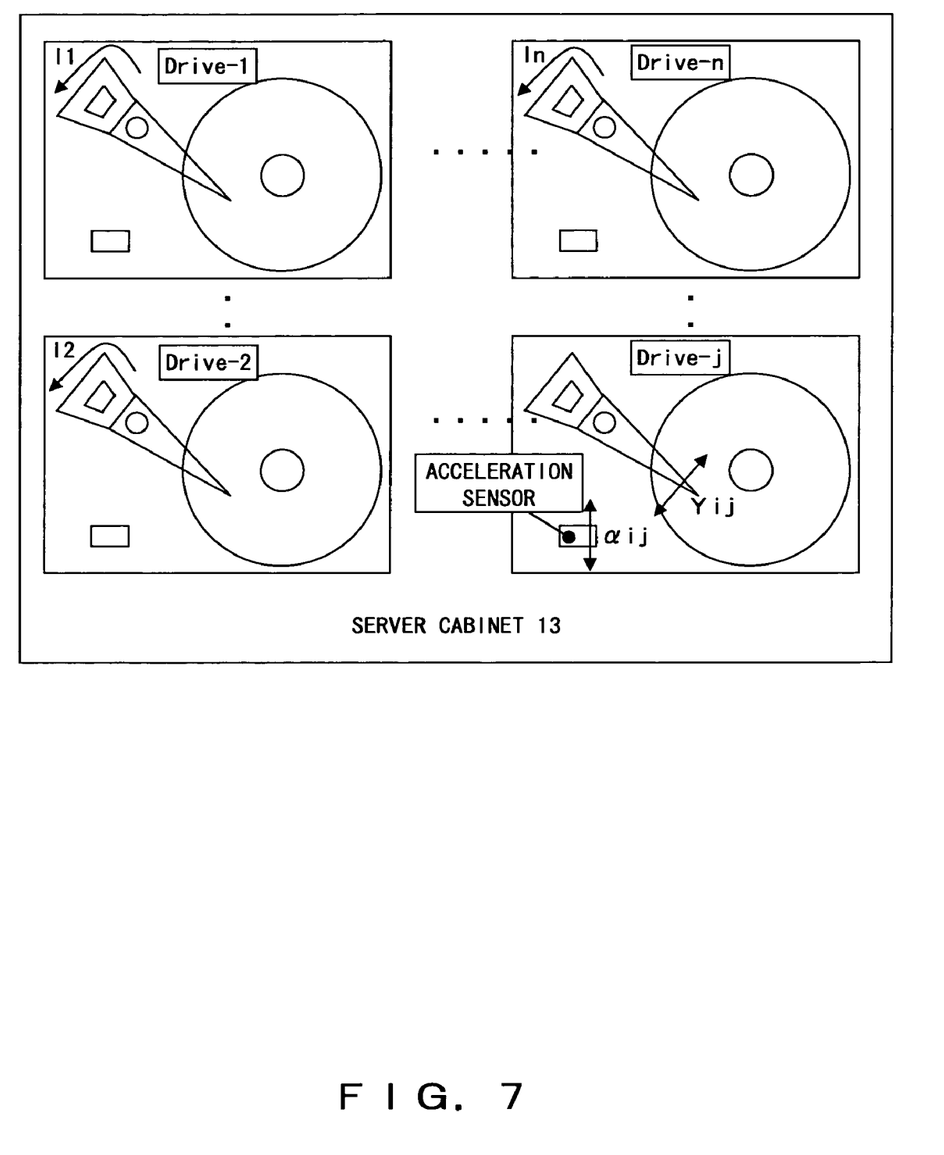
FIG. 7 conceptually shows the state where a plurality of hard disk drives (i=1~N) are installed in a server cabinet.

FIG. 7 conceptually shows the state where a plurality of HDDs (i=1~N) are installed in a server cabinet.

In the realization of the following preferred embodiments of the present invention, it must be known how another HDD affects a specific HDD. If an influence of another drive on a drive j is examined, current I1~In is applied to the actuator of drives 1~n. Then, the head position change Yij of the drive j in the case where a drive i is performing long distance seek is obtained as data. Then, Yij as the function of applied current Ii to the drive i can be obtained. This is called a "transfer function". Alternatively, the head position change Yij of the drive j is calculated as the function of an acceleration sensor detection value αij of the drive j in the case where current Ii is applied to the drive i. This is also called a "transfer function". Then, the influence on the drive j in the case where another HDD performs long distance seek is killed using the transfer function obtained in this way.

Figure 8:
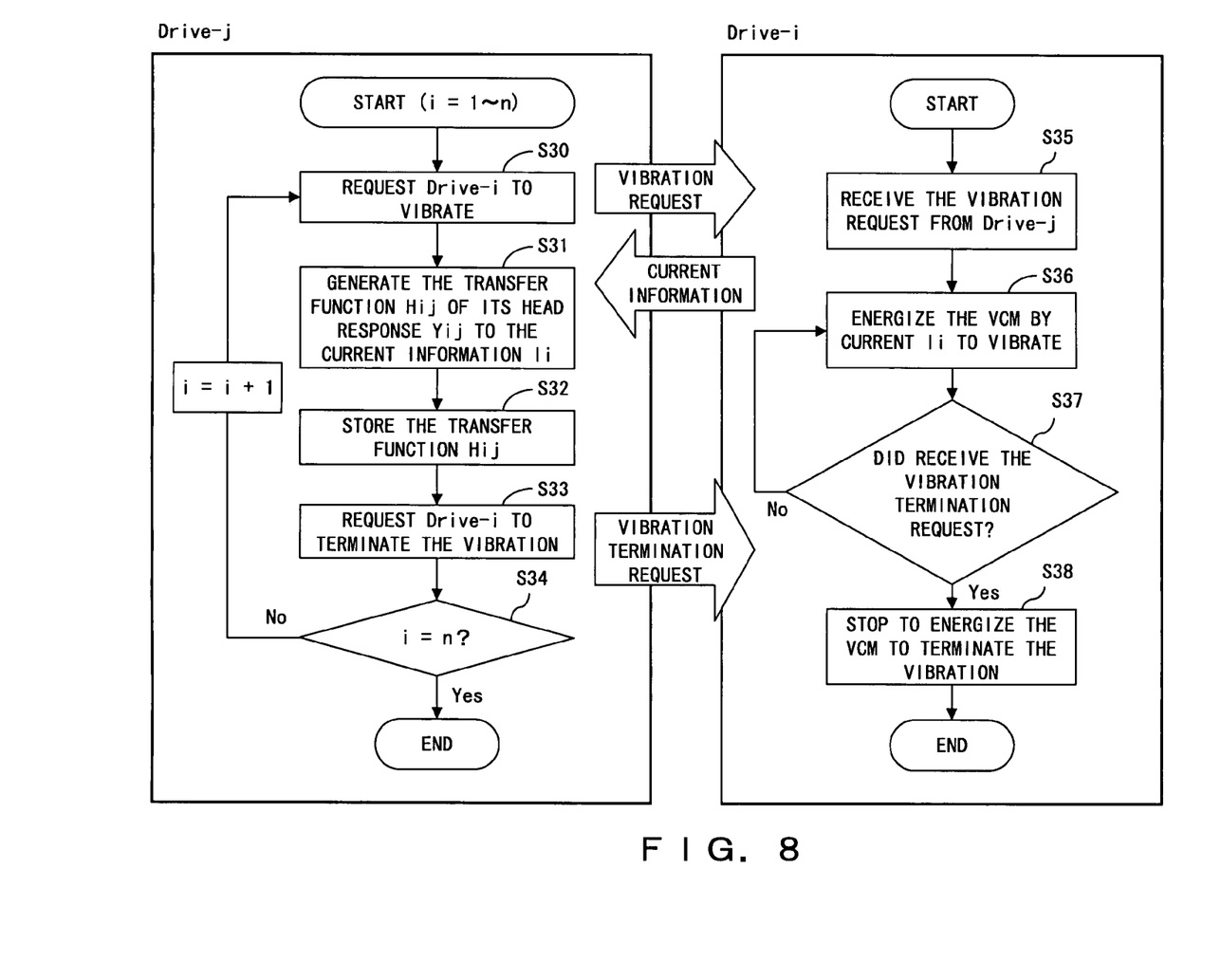
FIG. 8 is a flowchart showing how to obtain a transfer function in the second preferred embodiment of the present invention without using an acceleration sensor.

FIG. 8 is a flowchart showing how to obtain a transfer function in the second preferred embodiment of the present invention without using an acceleration sensor.

In order to provide a transfer function, calibration must be performed after installing HDDs in the server cabinet. In FIG. 8, in order to obtain a transfer function, the drive j requests the drive i to perform long distance seek (to apply vibration). If n HDDs are installed in the server cabinet, the process performed by the drive j is applied to all the n HDDs.

Firstly, in step S30, the drive j requests the drive i to apply vibration. When receiving the vibration request in step S35, in step S36, the drive i passes current Ii through the VCM to vibrate it. In step S31, the drive j receives the current information Ii and generates the transfer function Hij of its head response Yij to the Ii. In step S33, the drive j transmits a vibration termination request to the drive i. In step S37, the drive i waits for receiving the vibration termination request from the drive j. Upon receipt of the vibration termination request, in step S38 the drive i terminates the energization of the VCM. The drive j repeatedly applies this to the drives 1~n, according to the determination in step S34. Specifically, each HDD has the same number of transfer functions as installed HDDs. During the operation, the drive j performs feed forward control, based on the transfer function Hij generated in the calibration and the current information Ii about each HDD. In this case, during the calibration, the drive j must communicate the vibration request and current information. During the operation, the drive j must communicate the current information of the other HDDs.

Figure 9:
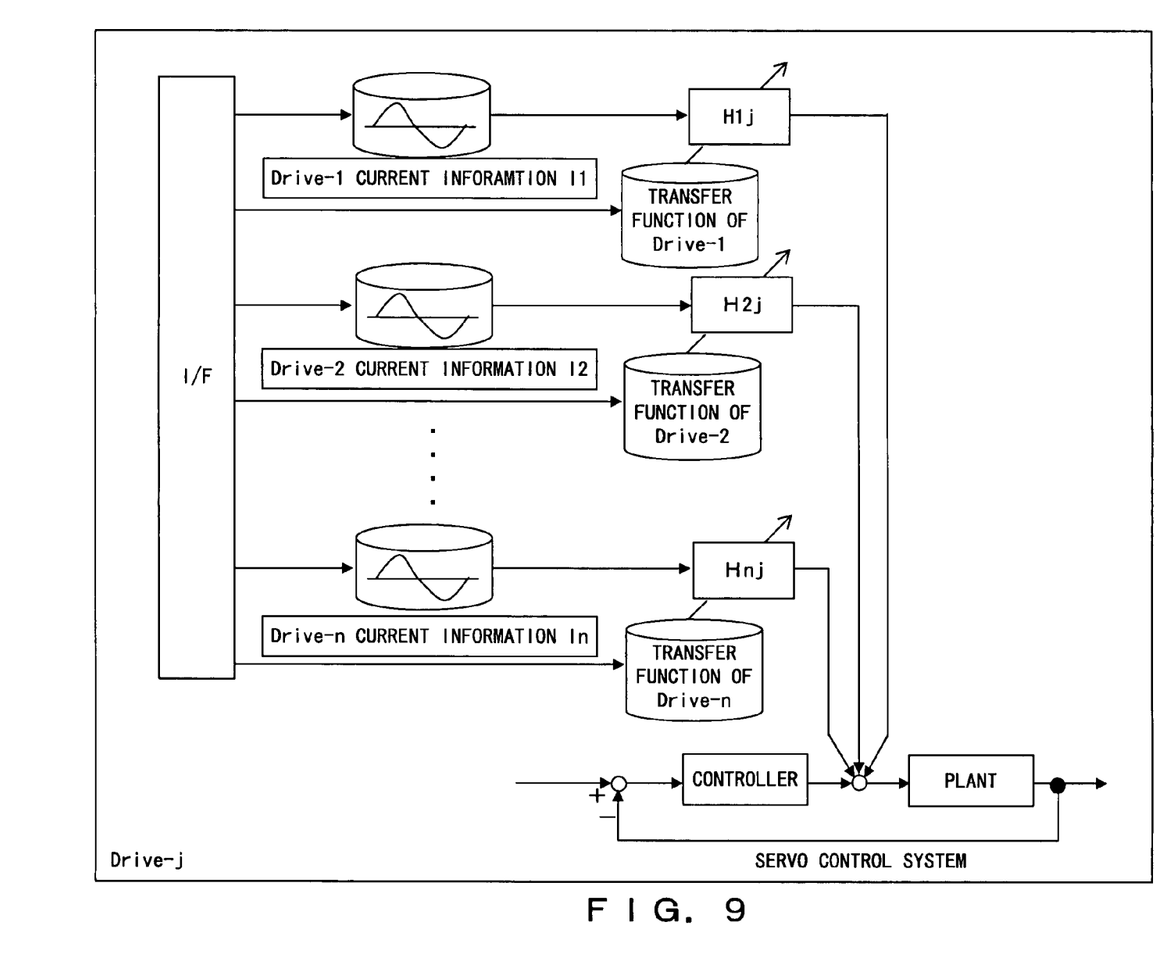
FIG. 9 shows the working operation of the hard disk drive in the second preferred embodiment of the present invention.

FIG. 9 shows the working operation of the HDD in the second preferred embodiment of the present invention.

The transfer functions generated in FIG. 8 are stored in each HDD. In FIG. 9, the drive j has transfer functions H1j~Hnj. Furthermore, the drive j receives current information (real-time current value) to the VCM of each HDD from the other HDDs. The drive j calculates the amount of change of its head, which is its output value, based on current information received from each drive and the transfer function of each drive and sums them. Then, they are provided to the servo control system. The servo control system comprises a plant, which is a VCM, and a controller. The servo control system controls in such a way that the amount of change of the head driven by the VCM decreases by providing the opposite sign value of the total value of the outputs of the transfer function.

As in the following preferred embodiments, there is also a method for installing an acceleration sensor in each HDD and using it.

Figure 10:
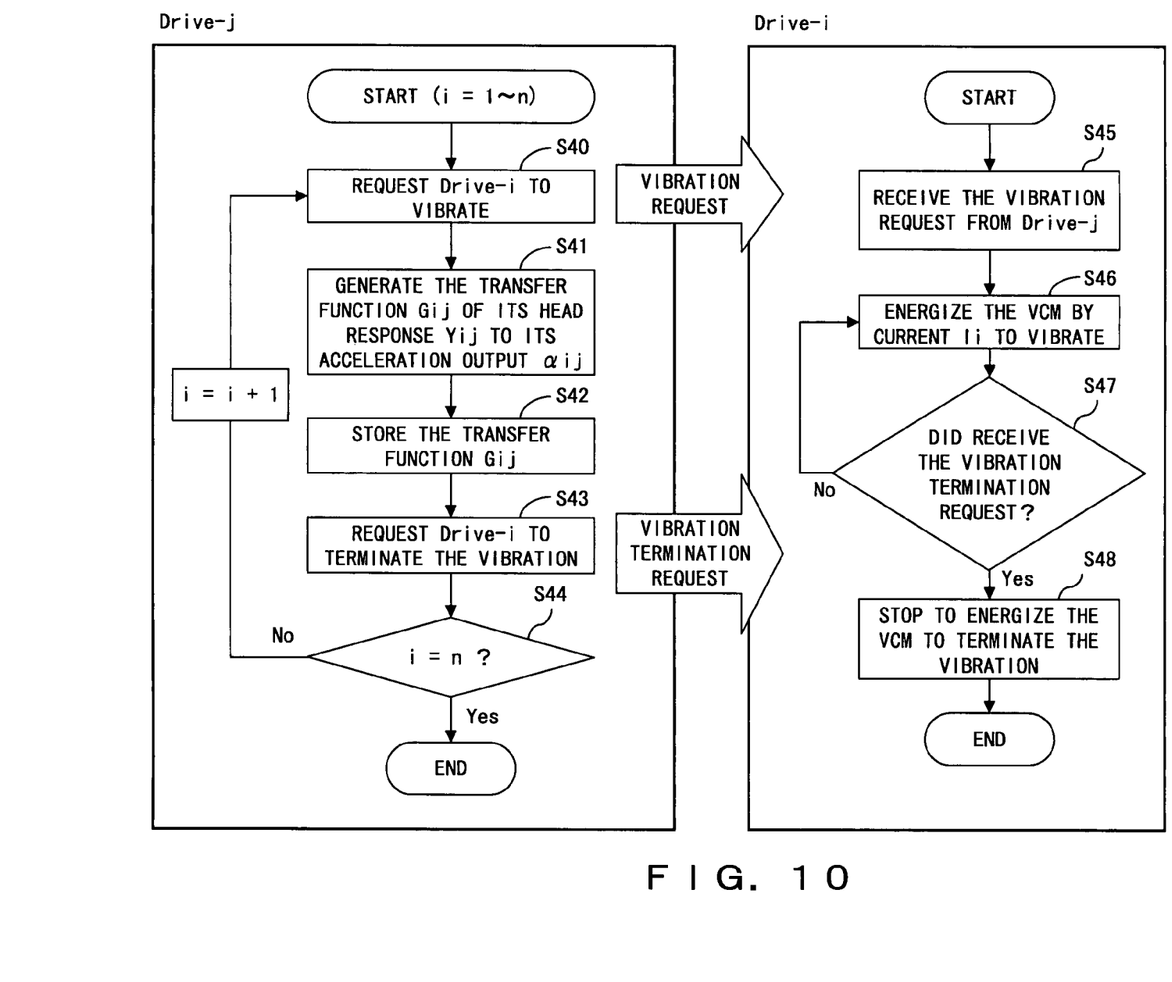
FIG. 10 is a flowchart showing how to obtain a transfer function in the third preferred embodiment of the present invention using an acceleration sensor installed in the hard disk drive.

FIG. 10 is a flowchart showing how to obtain a transfer function in the third preferred embodiment of the present invention, using an acceleration sensor installed in the HDD.

In order to provide a transfer function, calibration must be performed after installing HDDs in the server cabinet. In step S40, a drive j requests a drive i to apply vibration. When receiving the vibration request in step S45, in step S46, the drive i passes current Ii through its VCM to vibrate it. In step S41, the drive j generates the transfer function Gij of its head response Yij to the output αij of the acceleration sensor installed on the drive. In step S42, the drive j stores the transfer function Gij. Then in step S43, the drive j transmits a vibration termination request to the drive i. In step S48, upon receipt of the vibration termination request, the drive i waiting for the reception of the vibration termination request from the drive j in step S47 terminates the energization of the VCM. During the operation, the drive j performs feed forward control, based on the transfer function Gij generated in the calibration and its acceleration sensor output. In this case, in the calibration, the drive j must communicate the vibration request with the other HDDs. During the operation, the drive j must communicate the current information of the other HDDs with the other HDDs in order to determine which transfer function Gij to use.

Figure 11:
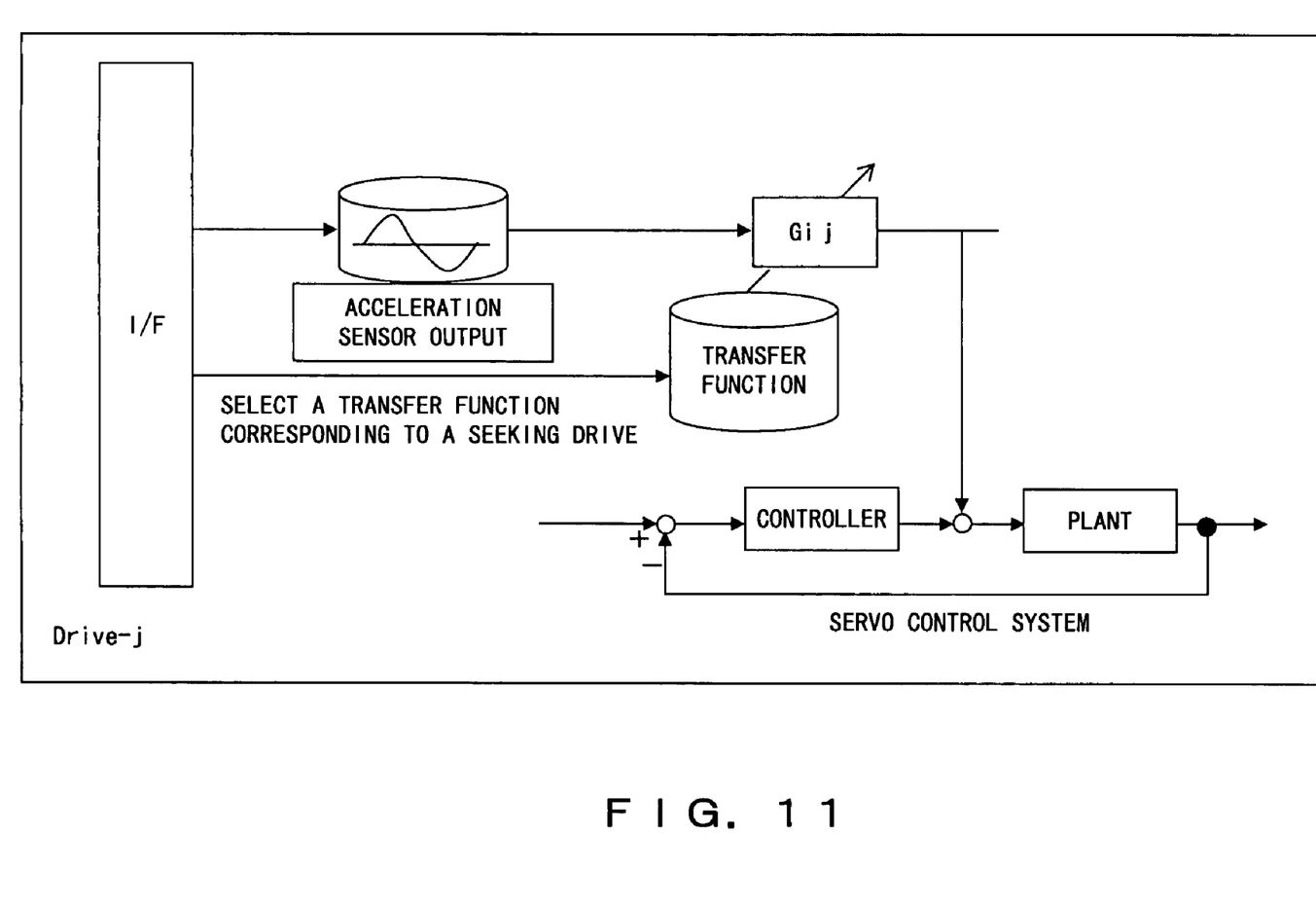
FIG. 11 shows the working operation of the hard disk drive in the third preferred embodiment of the present invention.

FIG. 11 shows the working operation of the HDD in the third preferred embodiment of the present invention.

The transfer functions generated in FIG. 10 are stored in each HDD. In FIG. 11, the drive j has transfer functions G1j~Gnj. Furthermore, the drive j receives the report that another drive during seek is performing long distance seek from the drive. The drive j calculates the amount of change of its head, which is its output value, based on information about which drive is performing long distance seek and the transfer function of the drive in seek and sums them. Then, they are provided to the servo control system. The servo control system comprises a plant, which is a VCM, and a controller. The servo control system controls in such a way that the amount of change of the head driven by the VCM decreases by providing the opposite sign value of the total value of the outputs of the transfer function.

Figure 12:
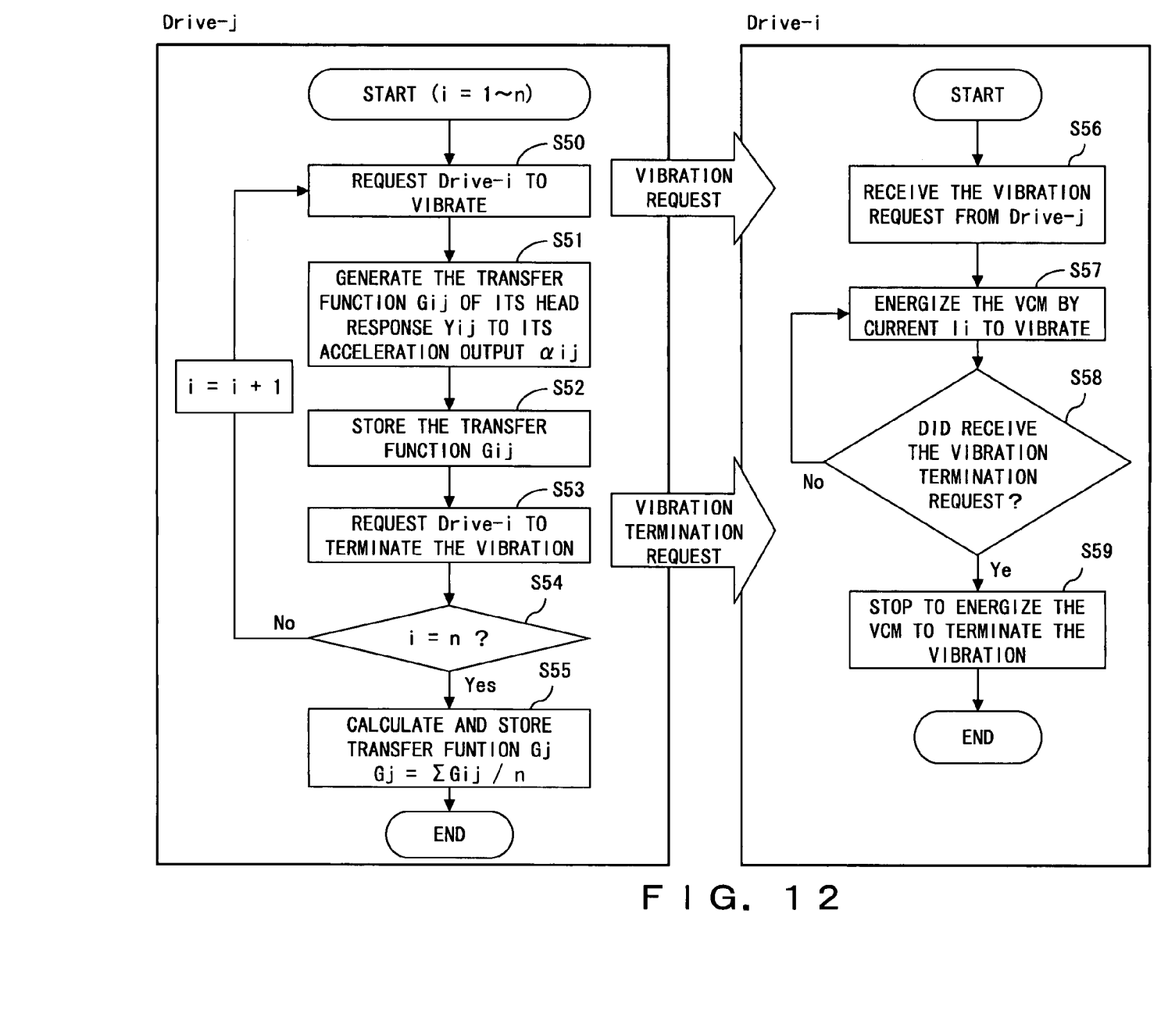
FIG. 12 is a flowchart showing how to obtain a transfer function using an acceleration sensor in the fourth preferred embodiment of the present invention (No. 1)
Figure 13:
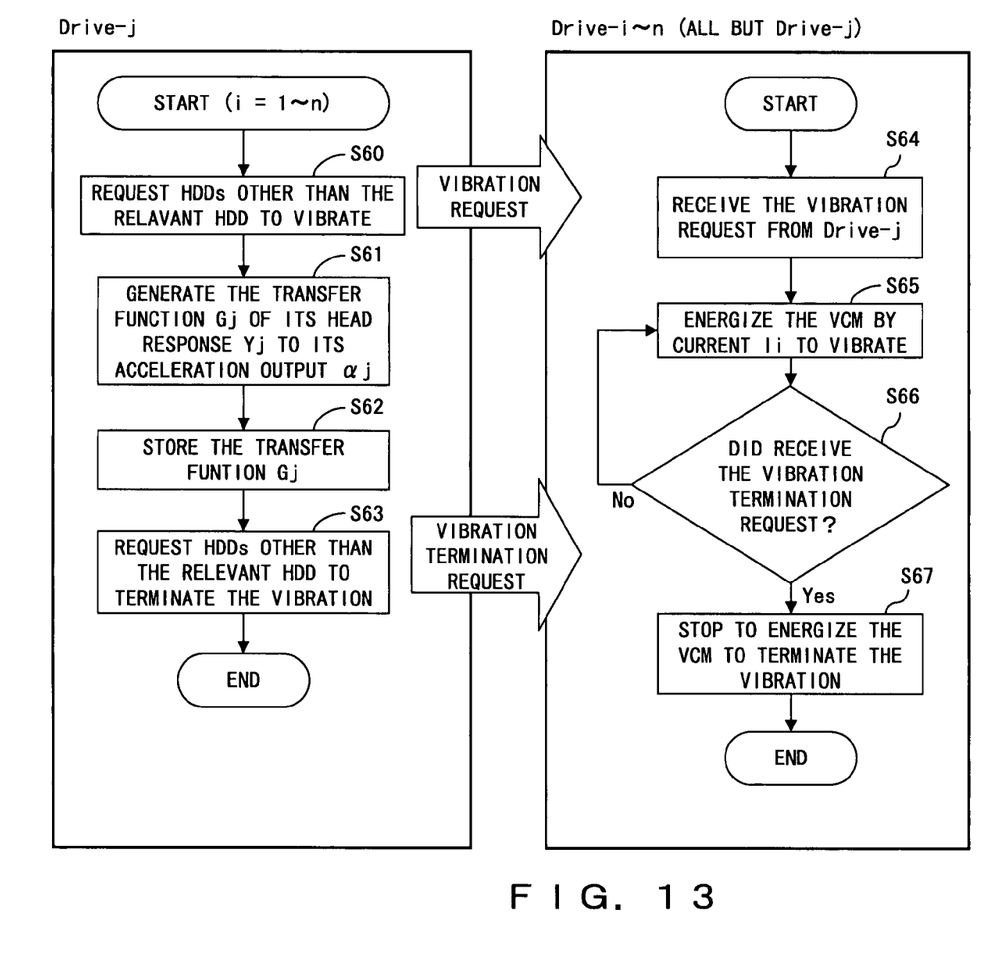
FIG. 13 is a flowchart showing how to obtain a transfer function using an acceleration sensor in the fourth preferred embodiment of the present invention (No. 2)

FIGS. 12 and 13 are flowcharts showing how to obtain a transfer function using an acceleration sensor in the fourth preferred embodiment of the present invention.

Although in FIGS. 8 through 11, the influence on the relevant HDD of each of the other HDDs in seek is different. However, if there is no difference between their transfer functions Gij, an average Gj=ΣGij/n can also be calculated. In that case, as shown in FIG. 12, an average Gj can also be generated by issuing a vibration request and sequentially applying vibration one by one. Alternatively, as shown in FIG. 13, Gj can be generated by applying vibration to all the HDDs but the relevant HDD at random.

In FIG. 12, a drive j issues a vibration request to a drive i. Upon receipt if the vibration request (step S56), in step S57 the drive i energizes the VCM, performs long distance seek and applies vibration. In step S51, the drive j generates the transfer function Gij of its head response Yij to the acceleration output αij of its acceleration sensor. In step S52, the drive j stores the transfer function Gij. Then, in step S53, the drive j issues a vibration termination request to the drive i. Upon receipt of the vibration termination request in step S58, in step S59 the drive i waiting for the reception of the vibration termination request from the drive j terminates the energization of the VCM. The drive j applies the process applied to the drive i to all the other drives, according to the determination in step S54. Then, after the processes of all the other drives are completed, in step S55 the average value of these, $Gj=\Sigma Gij/n$ is calculated based on all the obtained transfer functions Gij.

In FIG. 13, in step S60 a drive j issues a vibration request to all the other drives. In step S61 the drive j generate the transfer function Gj of its head response Yj to its acceleration output αj. In step S62, the drive j store the transfer function Gj. In step S63, the drive j issue a vibration termination request to all the other drives, upon receipt of the vibration termination request from the drive j in step S66, in step S67 all the other drives waiting for the reception of the vibration termination request from the drive j terminates the energization of the VCM.

Figure 14:
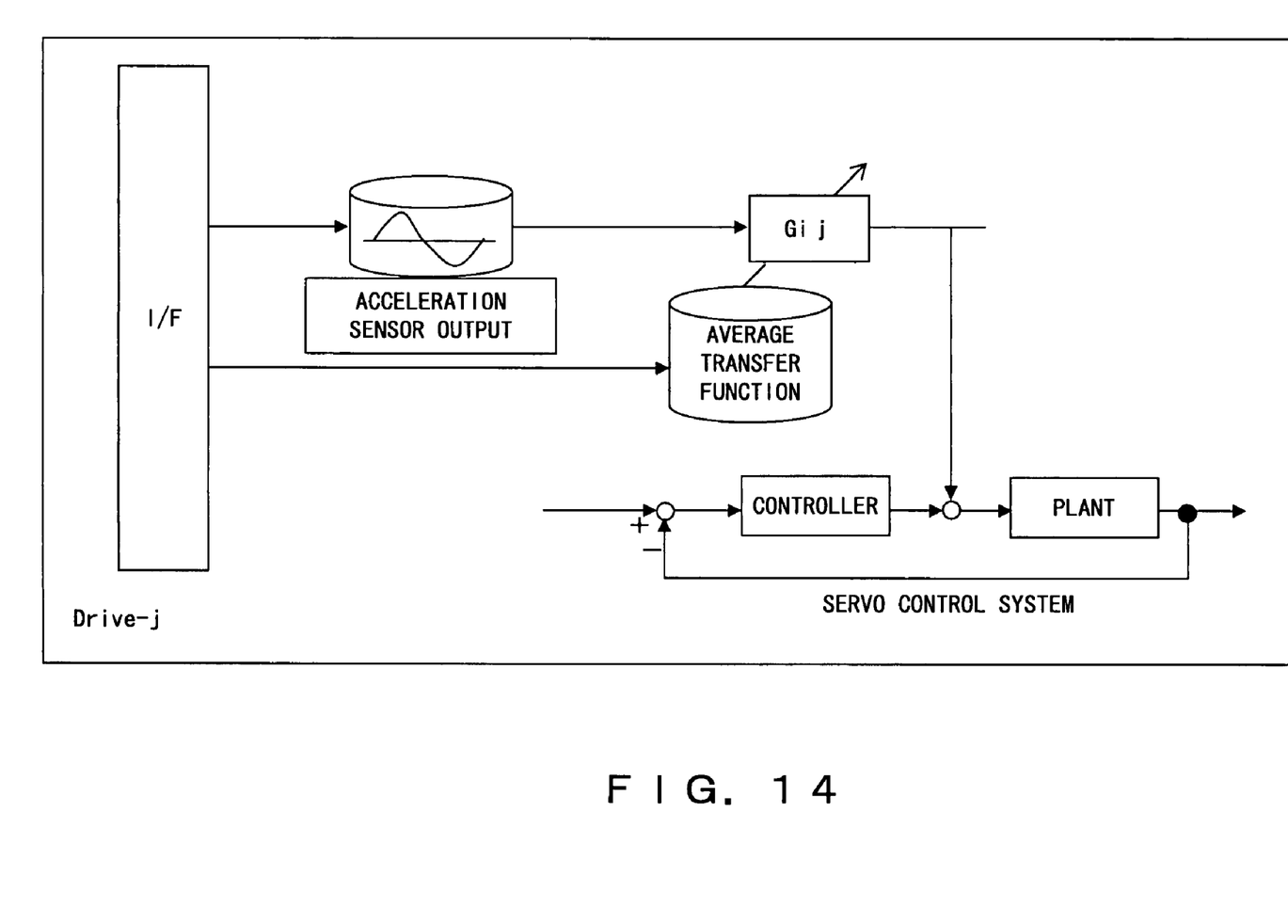
FIG. 14 shows the working operation of the hard disk drive in the fourth preferred embodiment of the present invention.

FIG. 14 shows the working operation of the HDD in the fourth preferred embodiment of the present invention.

During the operation, the relevant HDD performs feed forward control, based on the transfer function Gj generated in the calibration shown in FIG. 12 or 13 and its acceleration sensor output. In this case, the communication of vibration allocation request is needed only in the calibration.

Specifically, after an average transfer function Gj is obtained, the amount of change of the head is calculated by inputting only an acceleration output detected by an acceleration sensor, using the transfer function Gj and its opposite sign value is provided to the servo control system. Then, the VCM, which is indicated as a plant, is controlled to decrease the amount of change from the home position of the head driven by the VCM.

What is claimed is:

1. A disk device provided with a plurality of hard disk drives disposed in an environment where vibration due to an operation of the relevant disk drive affects an operation of another disk drive, comprising:
    an acquisition unit for obtaining an operational state of another disk drive; and
    a control unit for controlling an operation of a head of the relevant disk drive in such a way as to reduce an influence of an operation of another disk drive.

2. The disk device according to claim 1, wherein the operational state of the other disk drive is information about whether another disk drive is performing a seek operation with large vibration.

3. The disk device according to claim 2, wherein when another disk drive is performing a seek operation with large vibration, the control unit defers a writing operation of the relevant disk drive.

4. The disk device according to claim 1, wherein the operational state of another disk drive is a driving current value of the VCM of the other disk drive, and the control unit controls an operation of a head of the relevant disk drive in such a way as to reduce an influence of an operation of the other disk drive, using a transfer function to describe an influence on the relevant disk drive of another disk drive obtained in advance.

5. The disk device according to claim 4, wherein the transfer function is prepared for each other disk drive and incorporates influences obtained by the transfer functions, on the relevant disk drive of an operation of each other disk drive to control an operation of a head of the relevant disk drive, based on a driving current value obtained from each other disk drive.

6. The disk device according to claim 1, wherein the operational state of another disk drive is an acceleration by vibration detected by an acceleration sensor which is installed on the relevant disk drive, and the control unit controls an operation of a head of the relevant disk drive in such a way as to kill an influence of the acceleration, using a transfer function to describe an influence on the relevant disk drive of the acceleration detected by the acceleration sensor obtained in advance.

7. The disk device according to claim 6, wherein the operation state of another disk drive includes information about the existence/non-existence of an operation of another disk drive, the transfer function is prepared for each other disk drive, and when the acceleration sensor senses acceleration by vibration during an operation of the relevant disk drive, a corresponding transfer function is selected based on the information about the existence/non-existence of an operation of another disk drive and influences obtained by the selected transfer functions, on the relevant disk drive of an operation of each other disk drive are incorporated to control an operation of a head of the relevant disk drive.

8. The disk device according to claim 6, wherein the operational state of another disk drive is obtained only when a transfer function describing an overall influence on the relevant disk drive of each other disk drive is obtained, and when the acceleration sensor senses acceleration by vibration during an operation of the relevant disk drive, an operation of a head of the relevant disk drive is controlled using the transfer function describing an overall influence.

9. The disk device according to claim 1, wherein the operational state of another disk drive is obtained via a communication line directly connecting each disk drive.

10. A control method of a disk device provided with a plurality of disk drives disposed in an environment where vibration due to an operation of the relevant disk drive affects an operation of another disk drive, comprising:
    obtaining an operational state of another disk drive; and
    controlling an operation of a head of the relevant disk drive in such a way as to reduce an influence of an operation of another disk drive.

* * * * *